United States Patent [19]

Maggioni et al.

[11] Patent Number: 5,012,647
[45] Date of Patent: May 7, 1991

[54] THROTTLE-CONTROLLED HYDRAULIC POWER BRAKE BOOSTER

[75] Inventors: Virginio Maggioni, Rosta; Vittorino Torrielli, Torino, both of Italy

[73] Assignee: Fiat Auto S.p.A., Italy

[21] Appl. No.: 365,378

[22] Filed: Jun. 13, 1989

[30] Foreign Application Priority Data

Jun. 14, 1988 [IT] Italy .................... 67560 A/88

[51] Int. Cl.⁵ .................... F15B 1/047; F15B 9/10
[52] U.S. Cl. .................... 60/413; 91/372; 91/374
[58] Field of Search .................... 91/374, 368, 376 R, 91/372; 60/547.1, 413, 418

[56] References Cited

U.S. PATENT DOCUMENTS

| | | | |
|---|---|---|---|
| 3,366,424 | 1/1968 | Edwards | 137/627.5 X |
| 3,707,112 | 12/1972 | Ewald | 91/376 R |
| 3,707,880 | 1/1973 | Bach | 91/376 R |
| 3,875,748 | 4/1975 | Dehoff | 60/413 X |
| 3,889,467 | 6/1975 | Huffman et al. | 60/413 X |
| 4,750,406 | 6/1988 | Belart | 60/547.1 X |
| 4,860,636 | 8/1989 | Bertling et al. | 91/376 R |
| 4,860,637 | 8/1989 | Schmitt | 91/376 R |
| 4,873,128 | 11/1989 | Resch | 60/547.1 X |
| 4,882,976 | 11/1989 | Abbing et al. | 91/376 R |

FOREIGN PATENT DOCUMENTS

| | | |
|---|---|---|
| 2438469 | 10/1975 | Fed. Rep. of Germany . |
| 2438455 | 12/1977 | Fed. Rep. of Germany . |
| 3114243 | 4/1982 | Fed. Rep. of Germany . |
| 76741 | 6/1980 | Japan .................... 91/376 R |

Primary Examiner—Edward K. Look
Assistant Examiner—George Kapsalas
Attorney, Agent, or Firm—Eckert Seamans Cherin & Mellott

[57] ABSTRACT

A throttle-controlled hydraulic power brake employing a pressurized fluid produced via a pump and preferably stored in an accumulator for enabling servo-assisted displacement of a push rod acting on the master cylinder of a brake pump (of the same type employed on vacuum-operated power brakes) subsequent to axial displacement of a second push rod controlled directly by the brake pedal. Displacement of the second push rod towards the first provides, against the action of elastic means, for opening a first face seal valve, which feeds the pressurized fluid into a variable-volume accumulating chamber, so as to displace a piston connected axially to the first push rod and defining a movable wall of the accumulating chamber, and so close the valve. Opposite displacement of the second push rod, on the other hand, provides for opening a second face seal valve connecting the accumulating chamber to a drain.

8 Claims, 1 Drawing Sheet

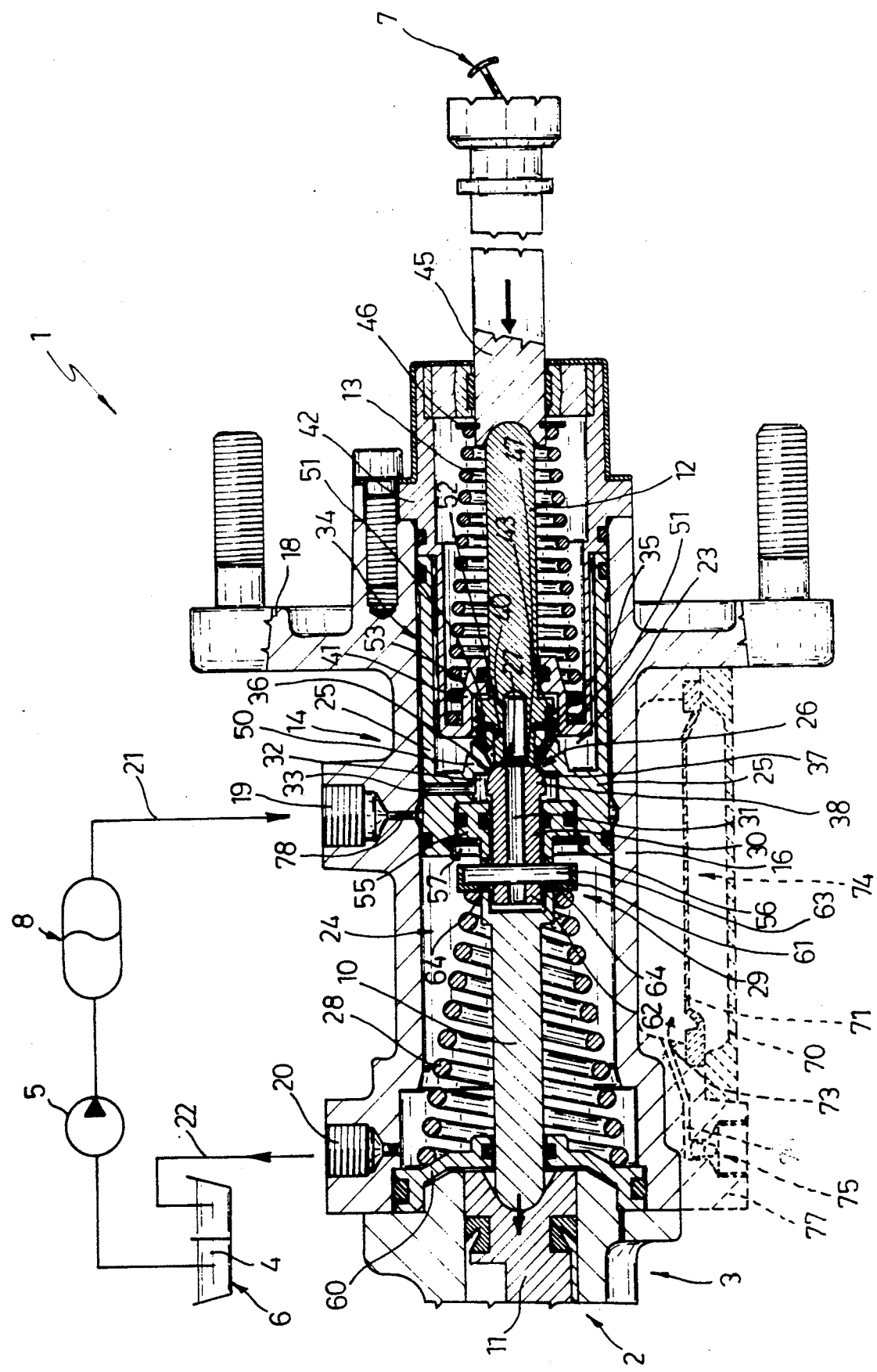

THROTTLE-CONTROLLED HYDRAULIC POWER BRAKE BOOSTER

BACKGROUND OF THE INVENTION

The present invention relates to a throttle-controlled hydraulic power brake employing the hydraulic energy produced by a pump for assisting user operation of the brake pump master cylinder and, consequently, braking of the vehicle via the brake pedal.

Known power brakes currently employed on motor vehicles are substantially either vacuum-operated or hydraulic. The vacuum-operated type features a pneumatic actuator operated by the intake vacuum of the vehicle engine, and, though relatively straightforward in design and cheap to manufacture, has the disadvantage of providing for only limited thrust. For this and other reasons involving size, vacuum-operated power brakes are used solely on automotive as opposed to commercial vehicles. The hydraulic type employs the energy of a pressurized fluid, usually oil, produced by a pump and fed via appropriate distributing means to a hydraulic actuator. Though more reliable and capable of producing a powerful thrust as required, as a function of the energy absorbed by the pump, known hydraulic power brakes present a number of drawbacks in terms of manufacturing cost, size and weight, in addition to being extremely complex in design.

SUMMARY OF THE INVENTION

The aim of the present invention is to provide a hydraulic power brake of straightforward design, which is compact, lightweight, relatively cheap to manufacture, and connectable, with no substantial modifications, to the master cylinders of brake pumps normally controlled by vacuum-operated power brakes.

With this aim in view, according to the present invention, there is provided a throttle-controlled hydraulic power brake comprising a first axially-sliding push rod designed to operate the master cylinder of a brake pump; a second axially-sliding push rod operated by a brake pedal against the action of first elastic means; and hydraulic means supplied by a pressurized fluid source and located between said first and second push rods, said hydraulic means being designed to enable servo-assisted displacement of said first push rod in accordance with and in proportion to corresponding displacement of said second push rod; characterised by the fact that said hydraulic means comprise a booster body housing a variable-volume pressure chamber designed to receive said pressurized fluid; a piston mounted, in fluidtight manner, axially integral with said first push rod and sliding axially inside said booster body, so as to define a movable wall of said pressure chamber; and a first and second face seal shuttle valve, the opening of which is controlled, against the action of second elastic means, by the axial position of said second push rod in relation to said piston; said first valve being designed to feed said pressurized fluid into said pressure chamber, and said second valve being designed to connect said pressure chamber to a circuit for draining off said pressurized fluid.

BRIEF DESCRIPTION OF THE DRAWING

A non-limiting embodiment of the present invention will be described by way of example with reference to the accompanying drawing, which shows a longitudinal section of a hydraulic power brake in accordance with the teachings of the present invention.

DETAILED DESCRIPTION OF THE PREFERRED EMBODIMENTS

Number 1 in the attached drawing indicates a throttle-controlled power brake designed for fitment on any known type of vehicle (not shown) for operating the master cylinder 2 of a known type of brake pump 3 (shown only partially), preferably of the type normally employed in conjunction with vacuum-operated power brakes. Subsequent to user operation of brake pedal 7, power brake 1 is operated by the energy of a fluid 4, e.g. oil, pressurized to a given value by a pump 5, which withdraws said fluid 4 from a tank, e.g. pan 6 on said vehicle engine (not shown), and preferably stores it, prior to use, in a hydraulic accumulator 8 of any known type. Power brake 1 substantially comprises a first axially-sliding push rod 10 cooperating in known manner with a piston 11 of brake pump 3 for operating master cylinder 2; a second axially-sliding push rod 12 operated by pedal 7 against the action of elastic means defined by a helical spring 13; and hydraulic means 14 mechanically located between push rods 10 and 12, and supplied by pump 5 and accumulator 8; said hydraulic means 14 being designed to enable servo-assisted displacement of push rod 10 in accordance with an in proportion to displacement of push rod 12 by the pressure applied on pedal 7, as well as to enable, when de-activated, direct mechanical control of master cylinder 2 via pedal 7, with no amplification of the pressure applied by the user on the same. Said hydraulic means 14 comprise a booster body 16 having an external flange 18 and two unions 19, 20 connected respectively to a supply line 21 and drain line 22 respectively connected to accumulator 8 and pan 6; a variable-volume pressure chamber 23 and drain chamber 24; connected respectively to unions 19 and 20 and formed coaxially and side by side inside body 16; a piston 25 having a preferably H-shaped radial section and mounted, in fluidtight manner, axially integral with push rod 10, and sliding axially inside body 16 so as to define a movable wall separating chambers 23 and 24 in fluidtight manner; and a pair of face seal shuttle valves 26, 27, the opening of which is controlled by the axial position of push rod 12 in relation to piston 25, and against the action of elastic means defined by a spring 28 housed inside chamber 24.

Valve 26 is designed to feed pressurized fluid 4 into pressure chamber 23, and valve 27 to connect pressure chamber 23 to a circuit 29 designed to enable the fluid inside chamber 23 to be drained off through chamber 24. According to the present invention, valves 26 and 27 comprise a shuttle 30 common to both, fitted through and sliding axially inside piston 25 in fluidtight manner, and having a through axial hole 31 forming part of said drain circuit 29, together with chamber 24, union 20 and line 22, and connecting chamber 23 to chamber 24. Valve 26 also comprises a cavity 32 formed inside piston 25, and an opening 35 connecting cavity 32 to pressure chamber 23. For any axial position of piston 25, cavity 32 communicates with accumulator 8 via a radial hole 33 formed through piston 25, and an outer annular groove 34 formed on piston 25 at union 19. Opening 35 is formed axially through piston 25, coaxially with shuttle 30, and is defined towards shuttle 30 by an inner edge 36 designed to cooperate in fluidtight manner with a peripheral front sealing surface 37 of one end 38 of shuttle 30 facing chamber 23 and housed inside cavity 32. In addition to shuttle 30 shared with valve 26, valve 27 comprises end 40 of push rod 12, inserted in fluidtight manner inside chamber 23 through an end wall 41 of the same, defined by a cup-shaped body 42 secured to brake body 16 and supporting push rod 12 by end 40 in sliding and fluidtight manner. Said end 40 is shaped so as to be insertable in radially slack manner inside cavity 32 through opening 35, and is designed to cooperate in fluidtight manner with a central front sealing surface 43 on end 38 of shuttle 30, surrounding axial hole 31 of shuttle 30, so as to plug said axial hole 31 when ends 40 and 38 are arranged contacting each other. A second end 44 of push rod 12, opposite end 40, cooperates with a rod 45 connected in known manner to brake pedal 7 in such a manner as to move in the direction of the arrow, subsequent to user operation of pedal 7. Spring 13 is inserted between end wall 41 and a shoulder ring 46 fitted integral with rod 45, and is thus housed inside cup-shaped body 42. A further ring 47 is housed inside chamber 23, between piston 25 and end 40 of push rod 12, for counteracting axial displacement of push rod 12 in the direction of cavity 32. At cavity 32, piston 25 presents a hollow dome-shaped projection 50 projecting axially inside chamber 23 and communicating with cavity 32 via opening 35, and with chamber 23 via a series of oblique holes 51. Said projection 50 supports spring 47, and presents a further through axial hole 52 supporting in sliding manner an end portion of end 40 of push rod 12. Said portion presents an integral shoulder 53 for spring 47, which is thus inserted between shoulder 53 and dome-shaped projection 50.

Shuttle 30 is supported in axially slack manner by a hollow end 55 of push rod 10, partially inserted inside a seat 57 formed on piston 25 on the chamber 24 side, and locked axially via a retaining ring 56. Spring 28 housed inside chamber 24 is located between a fixed shoulder defined by an end wall 60 sealing chamber 24 in fluidtight manner towards brake pump 3, and a shoulder ring 61 externally integral with end 62 of shuttle 30, opposite end 38, and projecting axially inside chamber 24. In particular, ring 61 rests against a pin 63 fitted transversely inside shuttle 30, the end 62 of which is thus housed inside the root portion of hollow end 55 communicating internally with chamber 24 via radial holes 64.

According to a variation of power brake 1 described above, hydraulic accumulator 8, instead of being formed in known manner as a separate part of the brake circuit, may be formed structurally integral with booster body 16, as shown by way of example by the dotted line in the bottom half of the attached drawing. If so, hydraulic accumulator 8, the remainder of which is connected as shown schematically in the top half of the attached drawing, comprises a tubular casing 70 mounted externally integral and coaxial with booster body 16, and a sleeve type deformable membrane 71 inserted coaxially and in fluidtight manner between booster body 16 and casing 70, so as to divide the gap defined between the same into two tubular variable-volume chambers 73, 74. The radially-outermost chamber 74 is sealed in fluidtight manner and filled with a compressible gaseous fluid; whereas the radially-innermost chamber 73 is connectable to pump 5 via a non-return valve 75 and duct 76 formed in an appendix 77 on booster body 16, e.g. opposite union 20. Said chamber 73 is also connected to pressure chamber 23 via a hole 78 formed radially through booster body 16. As shown by the continuous line in the attached drawing, said hole 78 usually connects pressure chamber 23 to union 19 which, in the variation described above, is of course dispensed with.

Power brake 1 operates as follows. Fluid 4 is pressurized by pump 5 and collected in accumulator 8, in particular, in chamber 73, if accumulator 8 is formed integral with booster body 16, Via Union 19 (if present) and hole 78, pressurized fluid 4 flows into groove 34 and through hole 33 into cavity 32 where it remains trapped; opening 35 being closed by virtue of surface 37 being normally maintained contacting edge 36 by the thrust exerted by normally preloaded spring 28. When brake pedal 7 is operated, rod 45 moves in the direction of the arrow, pushing push rod 12 with it so as to compress spring 13. Displacement of push rod 12 causes shuttle 30 to move in the same direction inside hollow end 55, in which it is housed in axially slack manner, thus compressing spring 28 and detaching sealing surface 37 from edge 36. This opens opening 35 to allow pressurized fluid 4 into pressure chamber 23 wherein piston 25 is thrust in the same direction as push rod 12, thus causing integral push rod 10 to move in the same direction so activate brake pump 3 by virtue of the thrust exerted by push rod 10 on piston 11. At the same time, displacement of piston 25 brings edge 36 back into contact with sealing surface 37, thus closing opening 35 and cutting off the flow of fluid 4 into chamber 23. The fluid 4 already inside chamber 23, however, is trapped so as to maintain sufficient pressure inside chamber 23 to keep spring 28 compressed and brake pump 3 activated. Further pressure on brake pedal 7 provides for further displacement of rod 45, so as to open opening 35, as described above, enable further displacement of piston 25 by fluid 4, and so increase the braking action of pump 3. When brake pedal 7 is released, spring 13 moves rod 45 in the opposite direction to that referred to above, thus enabling spring 47 to force push rod 12 and shoulder 53 into contact with end wall 41, and so detach end 40 from sealing surface 43. Hole 31 thus communicates with chamber 23, and the pressurized fluid in said chamber 23 flows through hole 31 into hollow end 55 and through holes 64 into drain chamber 26 from where it is fed back into pan 6 via union 20 and drain line 22. The pressure inside chamber 23 therefore drops and piston 25, by virtue of the pressure exerted by piston 11, moves, together with shuttle 30 pushed by spring 28, towards end 40 of push rod 11, so as to bring together end 40 and end 38 of shuttle 30 and so close hole 31. In this case also, therefore, after a relatively brief transient state, operation of pedal 7 restores power brake 1 to a state of equilibrium corresponding to a predetermined pressure on piston 25 and, consequently, predetermined brake performance of pump 3. Upon brake pedal 7 being released altogether, piston 25 moves into the limit position shown in the drawing, thus de-activating pump 3.

The advantages of the present invention will be clear from the foregoing description. In particular, power brake 1 is of straightforward design; is compact, lightweight and cheap to produce; may be formed structurally integral with the accumulator for enabling a further reduction in size and weight; and is formed from a small number of component parts. Also, each operation of the brake pedal corresponds to proportional hydraulic pressure on piston 25, thus reducing the effort required of the user for operating the brake pump. Gradual, carefully modulated braking is assured both by "follow-up" operation of valves 26, 27 as a function of the relative position of piston 25 and push rod 12, and by the pressurized fluid 4 through valves 26, 27 being constricted (thus reducing pressure) in proportion to the valve openings. The pressure in chamber 23 activating piston 25 is therefore proportional to both displacement and acceleration of pedal 7, thus providing for extremely rapid response in the event of emergency braking of the vehicle. Finally, provision of a hydraulic accumulator enables repeated operation of power brake 1 even when the vehicle engine, i.e. pump 5, is idle. In the event of malfunctioning or a shortage of fluid 4, power brake 1 according to the present invention nevertheless ensures mechanical continuity between pedal 7 and pump 3, thus enabling continued operation of pump 3, though of course not without a good deal of effort on the part of the user. By virtue of the location of springs 28 and 13, these are obviously compressed simultaneously as rod 45 moves towards push rod 10, so that the elastic reaction perceived by the user on pedal 7 increases gradually according to a predetermined law and as a function of the sum of the linear reactions of both springs.

We claim:

1. A throttle-controlled hydraulic power brake comprising a first axially-sliding push rod designed to operate the master cylinder of a brake pump; a second axially-sliding push rod operated by a brake pedal against the action of first elastic means; and hydraulic means supplied by a pressurized fluid source and located between said first and second push rods, said hydraulic means being designed to enable servo-assisted displacement of said first push rod in accordance with and in proportion to corresponding displacement of said second push rod; characterized by the fact that said hydraulic means comprises a booster body enclosing a variable-volume pressure chamber designed to receive said pressurized fluid; a piston mounted, in fluidtight manner, axially integral with said first push rod and sliding axially inside said booster body, so as to define a movable wall of said pressure chamber; and a first face seal shuttle valve and a second face seal shuttle valve, the opening of which is controlled, against the action of second elastic means, by the axial position of said second push rod in relation to said piston; said first valve being designed to feed said pressurized fluid into said pressure chamber, and said second valve being designed to connect said pressure chamber to a circuit for draining off said pressurized fluid, said pressurized fluid source consisting of a pump connected to said pressure chamber via the interposition of a hydraulic accumulator, said hydraulic accumulator comprising a tubular casing externally integral and coaxial with said booster body; and a sleeve type deformable membrane located coaxially and in fluidtight manner between said booster body and said casing, so as to divide the gap between the same into two tubular variable-volume chambers, the radially-innermost of which is connected to said pump and said pressure, and the radially-outermost of which is sealed in fluidtight manner and filled with a compressible gaseous fluid.

2. A power brake as claimed in claim 1, characterized by the fact that said first and second elastic means are located in such a manner as to be simultaneously compressed by displacement of said second push rod towards said first push rod, and so exert on said brake pedal on elastic reaction varying according to a predetermined law.

3. A power brake as claimed in claim 1, characterised by the fact that said drain circuit comprises a second variable-volume chamber formed inside said booster body, located coaxial and side by side with said pressure chamber, separated in fluidtight manner from said pressure chamber by means of said piston, and housing said second elastic means.

4. A power brake as claimed in claim 3 characterised by the fact that said first and second face seal valves comprise a single shuttle common to both, fitted through said piston in fluidtight manner and housed axially sliding inside the same, and having a through axial hole connecting said pressure chamber to said second variable-volume chamber.

5. A power brake as claimed in claim 4, characterised by the fact that said first valve also comprises a cavity formed inside said piston and communicating with said pressurized fluid source; and an opening connecting and enabling communication between said cavity and said pressure chamber; said opening being formed through said piston, coaxial with said shuttle, and being defined towards said shuttle by an inner edge designed to cooperate in fluidtight manner with a peripheral front sealing surface on a first end of said shuttle facing said pressure chamber and housed inside said cavity of said piston.

6. A power brake as claimed in claim 5, characterised by the fact that said second valve also comprises a first end of said second push rod inserted in fluidtight manner inside said pressure chamber and formed in such a manner as to be insertable in radially slack manner through said opening and into said cavity of said piston; said first end of said second push rod being designed to cooperate in fluidtight manner with a center front sealing surface of said first end of said shuttle surrounding said through axial hole on said shuttle, so as to plug said through axial hole.

7. A power brake as claimed in claim 6, characterised by the fact that said second push rod is supported in through and fluidtight manner at said first end by an end wall of said pressure chamber, and cooperates, at a second end opposite the first, with a rod connected to said brake pedal; a helical spring defining said first elastic means being inserted between said end wall of said pressure chamber and said rod; and a axial spring being inserted inside said pressure chamber, between said piston and said first end of said second push rod.

8. A power brake as claimed in claim 5, characterised by the fact that said shuttle is supported in axially slack manner by a hollow end of said first push rod, inserted in axially locked manner inside a seat formed on said piston on the side of said second variable-volume chamber; said second variable-volume chamber housing said second elastic means, which are defined by a helical spring located between a fixed shoulder defined by an end wall of said second variable-volume chamber, and a shoulder ring externally integral with a second end of said shuttle projecting axially inside said second chamber.

* * * * *